(12) United States Patent
Krolnik, II et al.

(10) Patent No.: US 9,001,468 B2
(45) Date of Patent: Apr. 7, 2015

(54) ADVANCED AIR BEARING SLIDER WITH MODULATION DECREASING STIFFNESS

(75) Inventors: James Ronald Krolnik, II, Brooklyn Park, MN (US); Adam Karl Himes, Plymouth, MN (US)

(73) Assignee: Seagate Technology LLC, Cupertino, CA (US)

(*) Notice: Subject to any disclaimer, the term of this patent is extended or adjusted under 35 U.S.C. 154(b) by 24 days.

(21) Appl. No.: 13/437,517

(22) Filed: Apr. 2, 2012

(65) Prior Publication Data

US 2013/0258528 A1    Oct. 3, 2013

(51) Int. Cl.
*G11B 5/60* (2006.01)
*G11B 15/64* (2006.01)
*G11B 17/32* (2006.01)
*G11B 21/20* (2006.01)

(52) U.S. Cl.
CPC .................................. *G11B 5/6082* (2013.01)

(58) Field of Classification Search
USPC .......................................... 360/235.4–237.1
See application file for complete search history.

(56) References Cited

U.S. PATENT DOCUMENTS

| | | | | |
|---|---|---|---|---|
| 4,420,780 A * | 12/1983 | Deckert | ...................... | 360/235.8 |
| 5,196,973 A * | 3/1993 | Chapin et al. | .............. | 360/236.1 |
| 5,488,524 A * | 1/1996 | Cunningham | ............. | 360/236.8 |
| 5,942,680 A | 8/1999 | Boutaghou | | |
| 6,128,163 A * | 10/2000 | Haddock et al. | ........... | 360/237.1 |
| 6,130,807 A * | 10/2000 | Marchon | ........................ | 360/135 |
| 6,147,838 A * | 11/2000 | Chang et al. | ................ | 360/235.6 |
| 6,157,519 A | 12/2000 | Kohira et al. | | |
| 6,160,683 A * | 12/2000 | Boutaghou | ................. | 360/237.1 |
| 6,503,132 B2 | 1/2003 | Ekstrum et al. | | |
| 6,611,401 B1 | 8/2003 | Burga et al. | | |
| 6,643,944 B2 | 11/2003 | Yoda et al. | | |
| 2002/0041467 A1 * | 4/2002 | Boutaghou et al. | ......... | 360/236.1 |
| 2002/0063995 A1 * | 5/2002 | Sannino et al. | ............. | 360/236.3 |
| 2002/0075600 A1 | 6/2002 | Schnur et al. | | |
| 2002/0145828 A1 * | 10/2002 | Mundt et al. | ................ | 360/235.6 |
| 2002/0191340 A1 | 12/2002 | Chapin et al. | | |
| 2004/0150916 A1 * | 8/2004 | Rao et al. | .................... | 360/235.8 |
| 2010/0091405 A1 * | 4/2010 | Huang | ......................... | 360/235.4 |
| 2010/0091406 A1 * | 4/2010 | Huang et al. | ................ | 360/235.4 |
| 2010/0149692 A1 * | 6/2010 | Fujimaki et al. | ............ | 360/235.8 |
| 2010/0157480 A1 * | 6/2010 | Watanabe | ................... | 360/235.4 |
| 2010/0265618 A1 | 10/2010 | Boutaghou et al. | | |
| 2011/0026164 A1 * | 2/2011 | Bolasna et al. | ............. | 360/236.6 |
| 2011/0122532 A1 * | 5/2011 | Bolasna et al. | ............. | 360/236.5 |
| 2011/0141622 A1 * | 6/2011 | Takeuchi | .................... | 360/235.4 |
| 2012/0134055 A1 * | 5/2012 | Tsuda et al. | ................ | 360/235.6 |

OTHER PUBLICATIONS

Jianfeng Xy and Bo Liu, "Flying Height Modulation and Femto Slider Design," IEEE Transaction on Magnetics, Sep. 2003, pp. 2438-2440, vol. 39, No. 5, IEEE.

Mingsheng Zhang, Bo Liu and Febiana Tjiptoharsono, "Approaches to reduce effect of short-range interactions in head disk interface," Microsyst Technol, 2009, pp. 1591-1595, Springer-Verlag.

\* cited by examiner

*Primary Examiner* — Adam B Dravininkas
(74) *Attorney, Agent, or Firm* — Hall Estill Attorneys at Law (57) ABSTRACT

A data storage device may have at least a slider constructed with at least one feature positioned on an air bearing region and separated from a data transducer. The at least one feature can be configured to provide a slider stiffness that decreases modulation while the at least one feature is floating above or in contact with a data storage media.

20 Claims, 6 Drawing Sheets

ADVANCED AIR BEARING SLIDER WITH MODULATION DECREASING STIFFNESS

SUMMARY

Various embodiments of the present invention are generally directed to a data storage device that may have at least a slider constructed with at least one feature positioned on an air bearing region and separated from a data transducer. The at least one feature can be configured to provide a slider stiffness that decreases modulation while the at least one feature is floating above or in contact with a data storage media.

DETAILED DESCRIPTION

Various embodiments of a slider with an advanced air bearing are generally disclosed herein. As industry progresses to higher areal density data storage devices, tolerances for various data storage components, such as head disk clearance and data bit size, can be reduced. Such reduced tolerances may lead to increased contact between a data transducing assembly and a data media, which can lead to miniscule variations resulting in structural and operational damage that severely hinders operation of the device. Thus, increasing the ability to control contact modulation between data media and data transducing elements during operation has become a heightened industry demand.

Accordingly, a data storage device may be constructed with at least one feature separated from a data transducer and positioned on an air bearing region of a slider. The at least one feature may be configured with a slider stiffness that decreases modulation while the at least one feature is floating above or in contact with a data storage media. The ability to control contact modulation while the slider is riding on an air bearing or in contact with the data media allows continuous operation of the data transducer regardless of media contact without detrimentally affecting the media or the slider.

Moreover, the continuous operation of the data transducer regardless of the flying or contacting position of the slider reduces operational complexity stemming from heater controlled flying height mechanism. With minimal dependency on maintaining data transducer flight, a data storage device can be less sensitive to process and clearance-setting variations.

Figure 1:
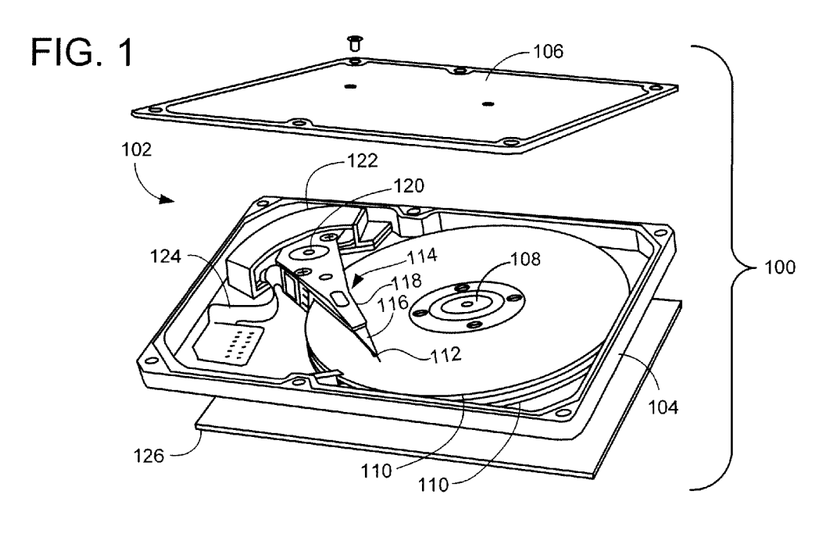
FIG. 1 provides an exploded view of an exemplary data storage device.

A partially exploded perspective view of an example disc drive data storage device 100 is generally illustrated in FIG. 1. The device 100 is provided to show an exemplary environment in which various embodiments of the present invention can be advantageously practiced. It will be understood, however, that the various embodiments of the present disclosure are not so limited.

As shown, the device 100 includes a sealed housing 102 formed from a base deck 104 and top cover 106. An internally disposed spindle motor 108 may be configured to rotate any number of storage media 110. The media 110 can be accessed by a corresponding array of data transducers that are each supported by a head gimbal assembly (HGA) 112. It should be noted that while FIG. 1 shows two magnetic recording discs and four corresponding heads, other numbers of heads and discs (such as a single disc, etc.) and other types of media (such as optical media, etc.) can alternatively be utilized as desired.

Each HGA 112 can be supported by a head-stack assembly 114 ("actuator") that has at least a flexible suspension assembly 116, which in turn is supported by a rigid actuator arm 118. The actuator 114 may pivot about a cartridge bearing assembly 120 through application of current to a voice coil motor (VCM) 122. In this way, controlled operation of the VCM 122 can cause the transducers of the HGA 112 to align with tracks (not shown) defined on the media surfaces to store data thereto or retrieve data therefrom.

A printed circuit cable 124 can be configured to facilitate electrical communication between the actuator 114 and device control electronics on an externally disposed device printed circuit board (PCB) 126. The printed circuit cable 124 can comprise one or more circuits that allow communication of several different components of the data storage device 100 with the PCB 126.

Figure 2:
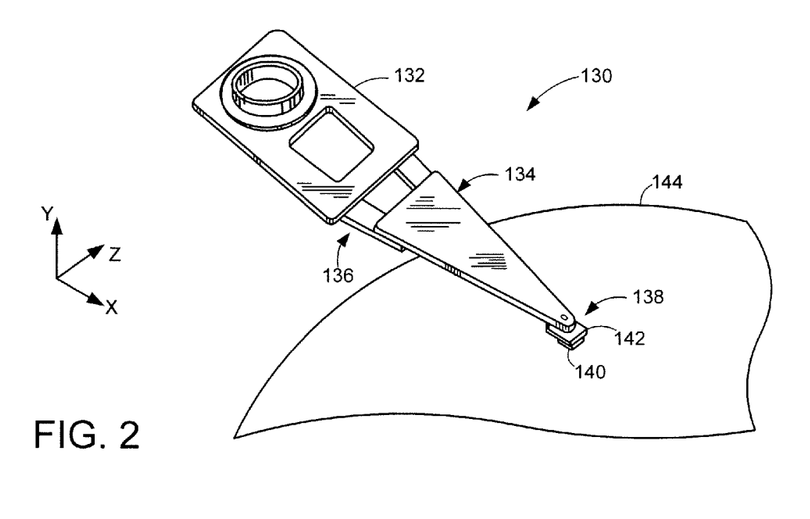
FIG. 2 shows various data access components capable of being used in the data storage device of FIG. 1.

FIG. 2 generally illustrates a perspective view of portions of an example data access assembly 130 that can be used like the data storage device 100 of FIG. 1. The data access assembly 130 may be configured with a base 132 supporting a load beam 134 via a preload bend section 136. An head gimbal assembly (HGA) 138 is supported at the distal end of the load beam 134 and may include at least a data transducer (head) 140 gimbaled for multi-axial rotation along pitch (x-axis) and roll (y-axis) directions via a gimbal plate 142 and dimple (not separately shown).

Figure 3A:
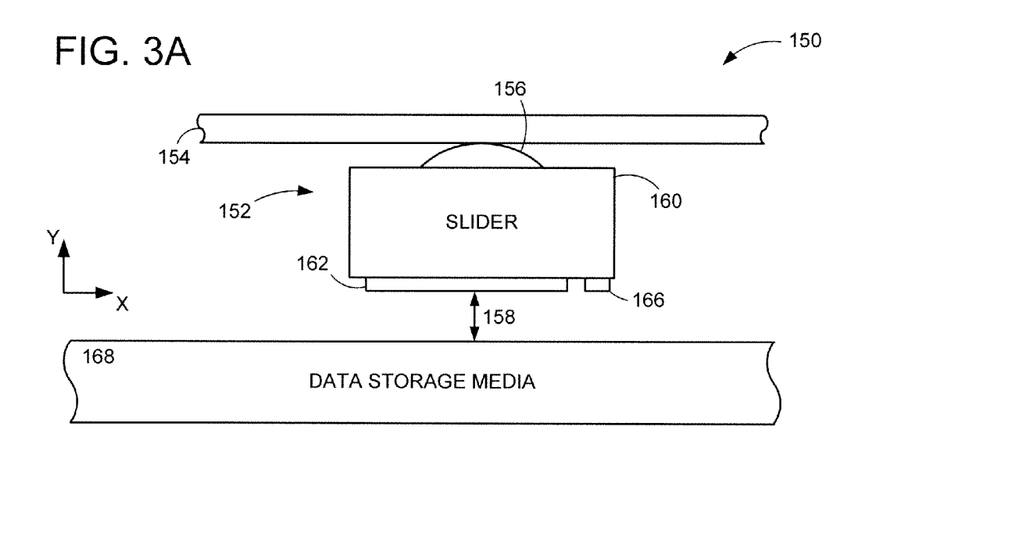
FIGS. 3A and 3B display block representations of a data access assembly operated in accordance with various embodiments.
Figure 3B:
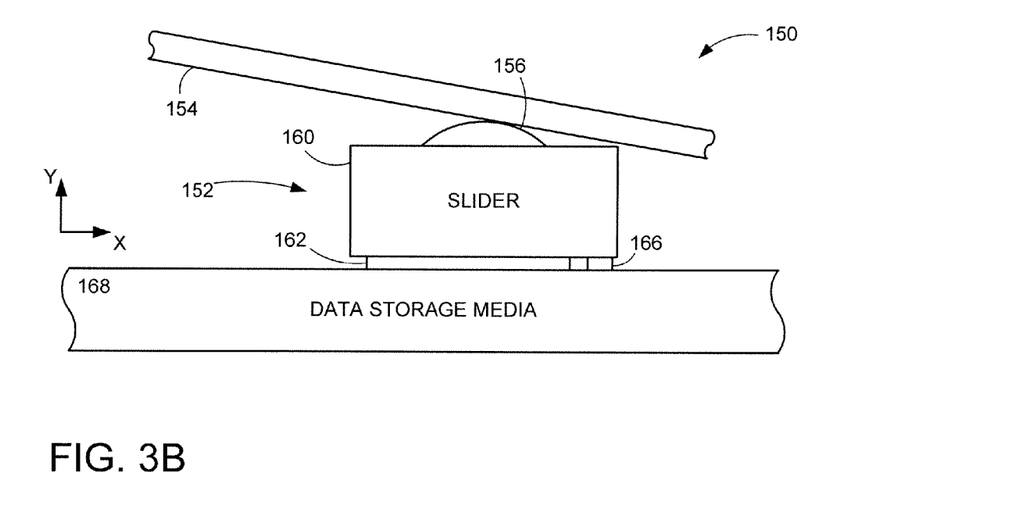

The transducer 140 can be affixed to a slider that faces and interacts with an associated media surface 144 to produce an air bearing on which the transducer floats during operation. The air bearing can modulate as the slider interacts with fluidic currents established by high speed rotation of the media surface 144. FIGS. 3A and 3B displays block representations of a head gimbal assembly (HGA) 150 during various stages of air bearing modulation. The HGA 150 may be constructed with unlimited numbers and types of components, but is shown in FIG. 3A with a head 152 mounted to a plate 154 via a gimbaled dimple 156 that provides pitch and roll motion for the head 152 to conform to an air bearing 158.

As the head 152 rides on the air bearing 158, fluid flowing beneath the slider 160 encounters at least one air bearing feature 162 that can stabilize the motion of a data transducer. Various embodiments of the present disclosure place at least one air bearing feature 162 at the trailing edge of the slider 160 that focuses pressure about the data transducer 166 while reducing air bearing 158 modulations. Configuration of the one or more air bearing features 162, which may be positioned anywhere on the slider 160, can provide a predetermined stiffness at the trailing edge of the slider 160 that optimizes air bearing pressure and reduces the head's sensitivity to pitch torques, which allows portions of the head 152 to contact the data media 168 without unduly wearing the data storage media 168 or the data transducer, as shown in FIG. 3B.

With the air bearing feature 162 increasing pressure about predetermined locations, such as about a data transducer, to stiffen the slider 160, the head 152 can continuously contact the data media 168 with a reduced duty cycle of head-media contact that may damage the various components. That is, the increased stiffness provided by the heightened pressure of the air bearing feature 162 reduces the operational modulation of the head 152 despite transducer 166 being in contact with the data media 168.

The air bearing feature 162 can be configured in a number of non-limiting manners to provide a predetermined slider stiffness that allows the slider to contact the data media 168 in a predetermined orientation with the data media that provides reduced contact modulation. In the example shown in FIG. 3B, the slider 160 has an orientation that matches the data media surface. However, the transducer feature 166 can contact the data media 168 with an angled orientation, such as where only the protruded data transducer 166 is in contact. The predetermined contact orientation of the head 152 and the data media can further be controlled by a heater induced protrusion.

However, such heater induced protrusion can experience distributions that limit how low air bearing clearances can be set and increase the likelihood of head-media contact due to incorrect settings, process variations, and environmental effects. As such, configuring the slider with an advanced air bearing that reduces the air bearing clearance modulation amplitude both while operating in clearance and while operating in contact can not only minimize inadvertent head-media contact but can also allow continuous head-media contact for data access operations.

Figure 4A:
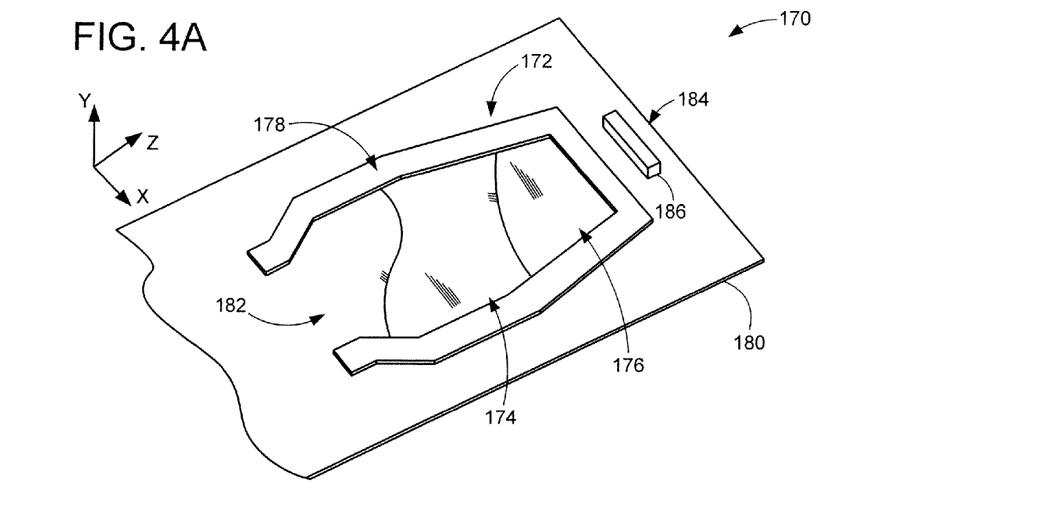
FIGS. 4A and 4B illustrate perspective and top views of an example slider constructed in accordance with various embodiments.
Figure 4B:
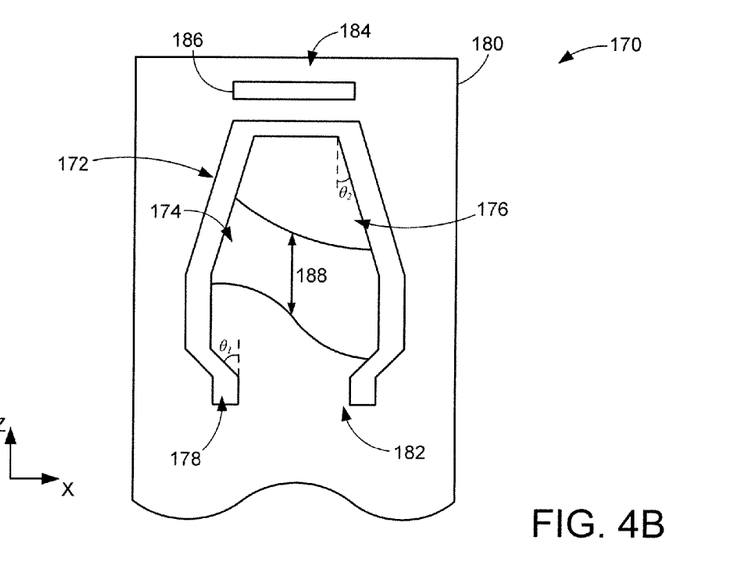

FIGS. 4A and 4B provide perspective and top views of an example slider 170 configured with an advanced air bearing 172 created at least in part by a plurality of air bearing features 174 and 176. While the advanced air bearing 172 can be positioned anywhere on the slider body 180, positioning the advanced air bearing 172 substantially in the center of the slider 170, along the X axis, can allow a raised air bearing wall 178 to be formed around an air bearing region 182 and focus pressure in predetermined areas of the slider. Pressure can further be optimized over predetermined areas, such as a data transducer region 184, by configuring the air bearing features 174 and 176 with varying heights above the slider body 180.

As shown in FIG. 4A, the air bearing region 182 is constructed as a non-limiting cantilevered tongue shape with the air bearing features 174 and 176 being formed thereon. The air bearing features 174 and 176 along with the air bearing surface 178 can be individually or collectively configured with varying height profiles that can increase stiffness in the slider 170 by balancing interplay between the pressures generated by the air bearing features 174 and 176 and transducer protrusion 186.

It should be noted that the air bearing features 174 and 176, air bearing wall 178, and transducer protrusion 186 can be individually or collectively positioned, shaped, and formed in a variety of manners, such as longitudinally centered about the trailing edge of the slider, which may promote flight and in-contact head modulation reduction.

In the top plan view of FIG. 4B, the position and construction of the various slider elements can be adjusted to provide predetermined slider body 180 stiffness and pressure about the data transducer region 184. One or more sidewalls of the air bearing region 182 may be configured to have predetermined shape, such as an arrowhead, and angles, like $\theta_1$ and $\theta_2$, that taper the region 182 towards the trailing edge of the slider body 180.

The mill depth and step lengths of the air bearing features 174 and 176 can be configured, in some embodiments, to provide predetermined pressure focused in an optimized pressure area, like the adjacent the transducer region 184 opposite the air bearing wall 178. That is, the cross-sectional shape and elevation (length and height) can be evaluated to produce a designed pressure about the slider body 180, which may correspond with a slider body stiffness that decreases slider 170 modulations whether one or more portions of the slider 170 are in contact with a data storage media.

Various embodiments create elevation steps between the first and second feature air bearing features 174 and 176, as displayed, and configure different feature lengths 188, measured along the Z axis, that produce a predetermined feature shape that may induce stiffness in the trailing edge of the slider body 180 and allows for stable slider 170 operation with or without media contact. Other embodiments configure the air bearing features 174 and 176 to operate data access operations from an adjacent data storage media with continual contact by at least the air bearing wall 178 without contact by the transducer protrusion 186 or any other part of the slider body 180.

Figure 5A:
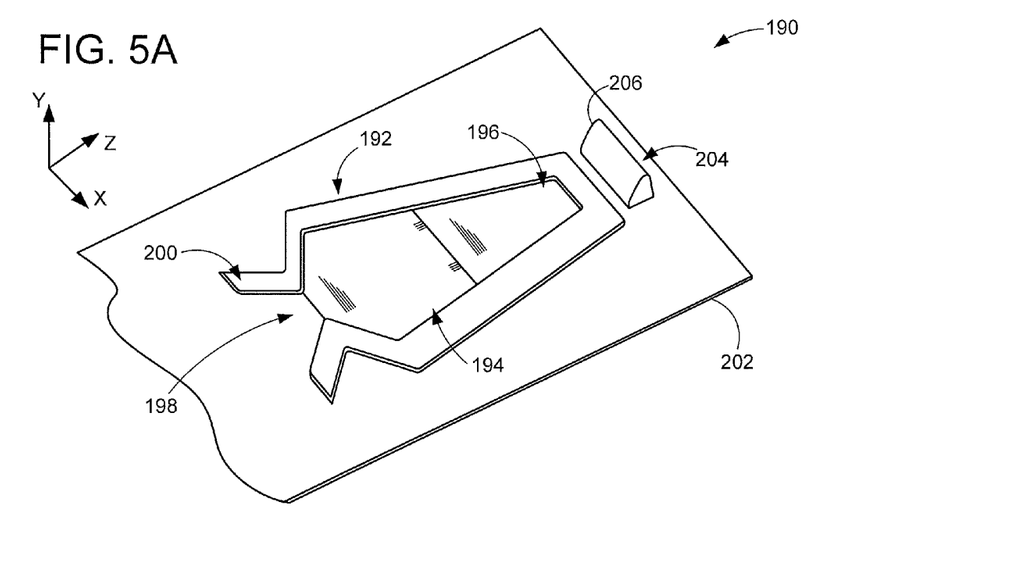
FIGS. 5A and 5B display perspective and top views of an example slider.
Figure 5B:
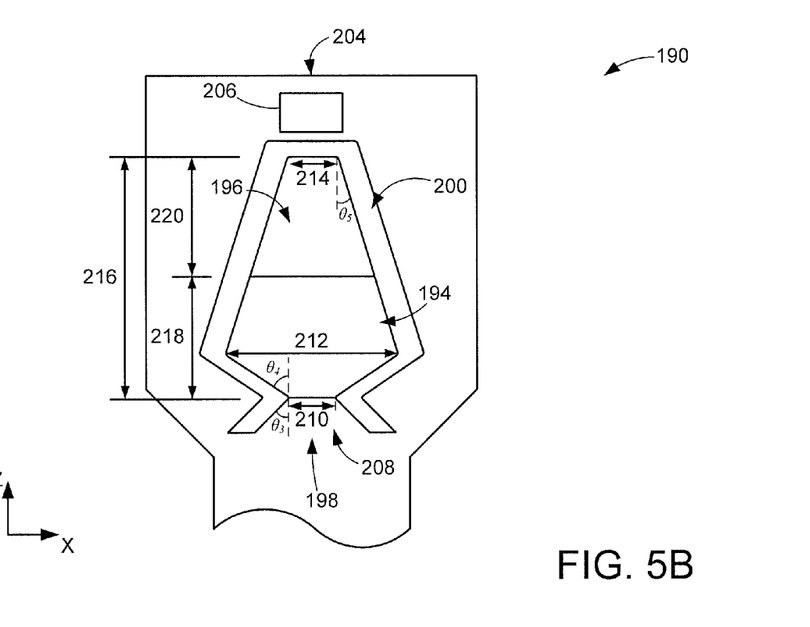

FIGS. 5A and 5B respectively show perspective and top views of another example slider 190 configured with an advanced air bearing 192 with first and second air bearing features 194 and 196 constructed on an air bearing region 198 within an air bearing wall 200 with varying heights above the slider body 202 and straight height transitions, as opposed to the curvilinear height transitions displayed in FIGS. 4A and 4B.

The shape and heights of the air bearing wall 200 can be used individually or in combination the air bearing features 194 and 196 to provide optimized slider stiffness about a data transducer region 204 and transducer protrusion 206. While the height and shape of the air bearing features 194 and 196 are unlimited, various embodiments maintain that no portion of the air bearing region 198 extends above the air bearing wall 200, which may have a varying cross-sectional shape, such as rectangular and continuously curvilinear.

The configuration of the air bearing features 194 and 196 can be tuned to be similar or dissimilar to the transducer protrusion 206, air bearing region 198, and air bearing wall 200 to ensure pressure is focused to allow for data access operations to be conducted whether the slider is in contact with a data media or in flight. As such, the air bearing region 198 and features 194 and 196 are not restricted to that displayed in FIGS. 5A and 5B and can be modified at will. For example, the continuously tapering air bearing region 198 shape can be modified to an unlimited variety of positions and shapes designed to focus pressure and provide a predetermined amount of stiffness for the trailing edge of the slider body 202.

With the air bearing region 198 provided in FIGS. 5A and 5B, the expanding width of region 182 of FIGS. 4A and 4B is replaced with a defined throat portion 208 where the first air bearing feature 194 sidewall tapers at a first predetermined angle $\theta_3$ to reach a reduced width 210, as measured along the X axis. The throat portion 208 expands to an intermediate width 212 with a second predetermined angle $\theta_4$ that may, or may not; be the equal opposite of the first predetermined angle $\theta_3$. From the intermediate width 212, the first and second air bearing features 194 and 196 have continuously tapering sidewalls at a third predetermined angle $\theta_5$ that reduces the width of the features 194 and 196 to a trailing width 214, adjacent the trailing edge of the slider body 202.

The reducing width of the air bearing region 198 may correspond to a predetermined length of the region 216 as well as the first and second air bearing features 218 and 220, as measured longitudinally along the slider body 202. Such advanced air bearing tuning and optimization can achieve focused pressure around a preselected region of the slider 190, such as the transducer region 204.

In various non-limiting embodiments, the sizes of the reduced width 210 and trailing width of the throat portion 208 are tuned and optimized in relation to the predetermined region length 216 as well as to the air bearing feature lengths 218 and 220 of to provide continual predetermined pressure with increased slider body 202 stiffness, which reduces slider 190 modulation, regardless of any portion of the slider 190 riding on an air bearing or in contact with a data storage media.

Figure 6A:
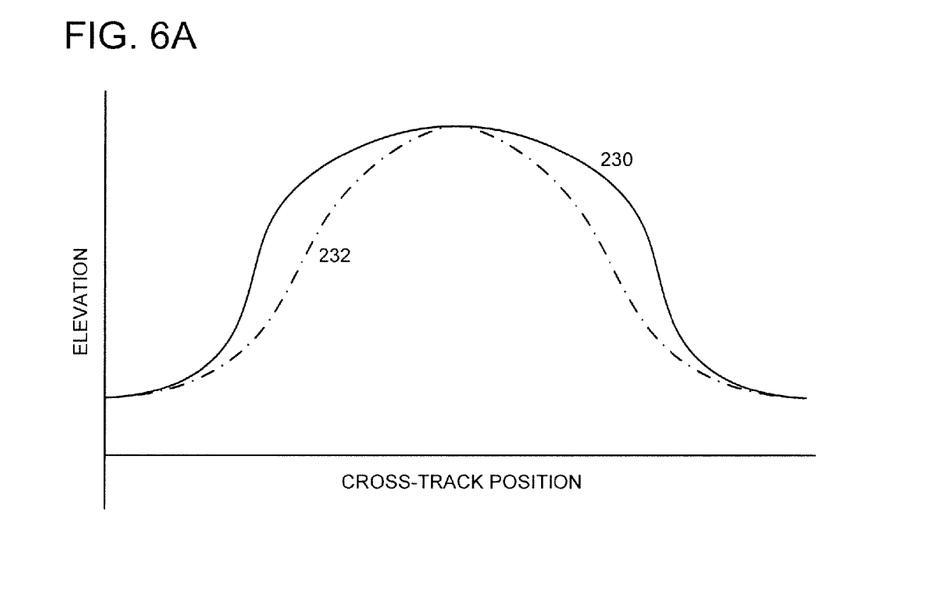
FIGS. 6A and 6B plots structural data generally associated with various components constructed in accordance with various embodiments.
Figure 6B:
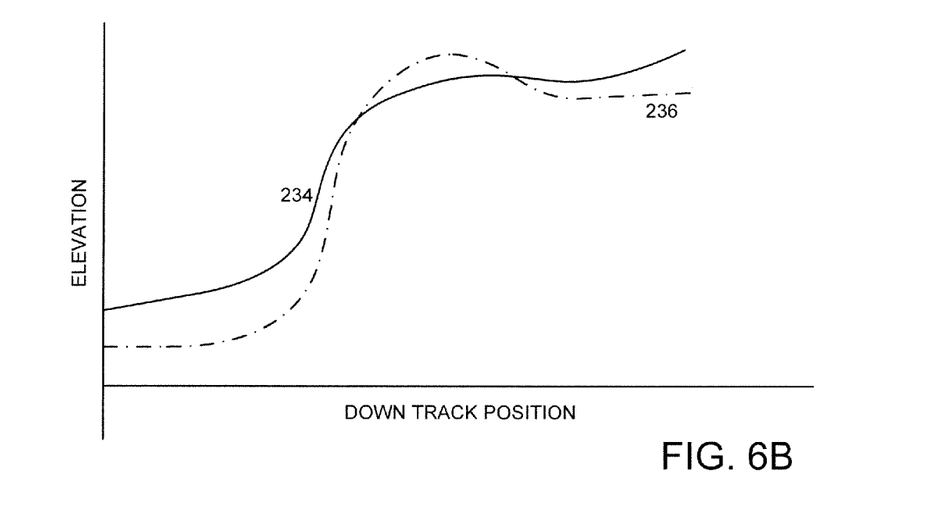

The combination of shaped air bearing region 198 and features 194 and 196 can provide the ability to tune the configuration of the slider 190 and provide an optimized slider body 202 pressure corresponding to predetermined trailing edge stiffness. FIGS. 6A and 6B plot feature protrusion profiles that correspond with feature protrusions configured according to various embodiments. FIG. 6A display example cross track sectional profiles 230 and 232 of transducer features that can be tuned to produce optimized slider stiffness.

Profile 230 shows a continuously curvilinear transducer feature protrusion shape with a first predetermined vertical steepness that differs from profile 232, which has a more gradual vertical steepness and greater overall elevation. The cross-sectional shapes displayed by profiles 230 and 232 can further be configured with down track sectional profiles 234 and 236 shown in FIG. 6B. Solid profile 234 illustrates how the cross track sectional shape of 230 can have a continuously curvilinear down track vertical steepness that is less than the vertical steepness of the segmented down track sectional profile 236, which corresponds with cross track sectional profile 232.

While the cross-sectional profiles 230, 232, 234, and 236 of FIGS. 6A and 6B show varying shapes capable of tuning slider modulation, such profiles are not required or limited. For example, profiles 230 and 234 can be used for a transducer feature, such as transducer protrusions 186 of FIG. 4A and protrusion 200 of FIG. 5A.

Figure 7:
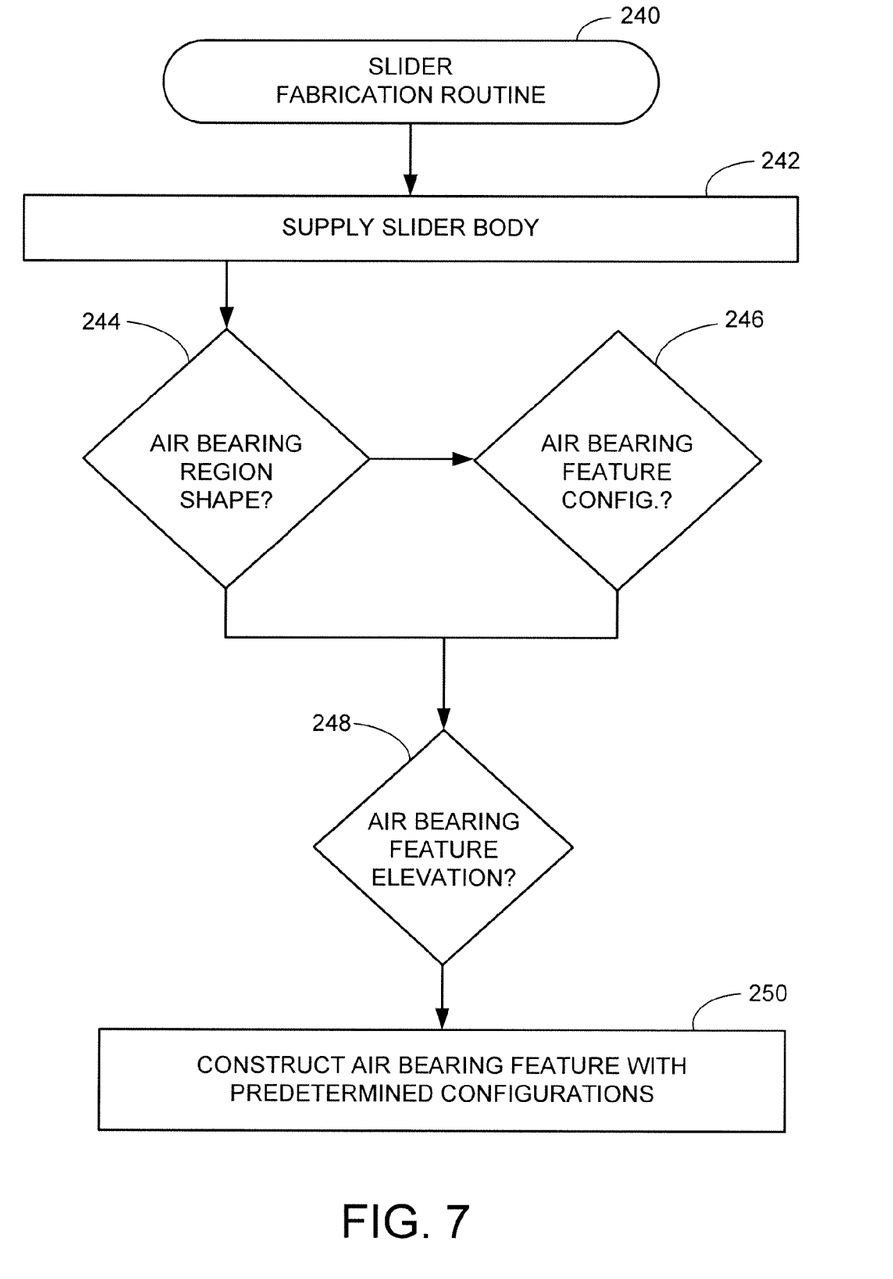
FIG. 7 provides a flowchart of an example data access assembly fabrication routine illustrative of steps carried out in accordance with various embodiments.

FIG. 7 provides a flow chart for an example slider fabrication routine 240 performed in accordance with various embodiments. The routine initially supplies a slider body in step 242. The slider body may be a single or multi-layer structure that is constructed with electrical and mechanical elements, such as a flex circuit and bend section. Decision 244 then evaluates the shape of an advanced air bearing that may include an air bearing region, such as region 182 of FIG. 4A.

Next, decision 246 determines the configuration of at least one air bearing feature, which can include the size, shape, transition shape, and number of features. For example, the arrowhead air bearing region and transition designs of FIG. 5A compared to the designs of FIG. 4A. Such air bearing feature configurations can be similar to or different from the shape of the air bearing region formed in step 246, and be constructed of a plurality of differing sidewall angles that produce a variety of feature widths corresponding to an overall feature length.

Decision 248 evaluates the air bearing feature elevation in relation to the slider body and to the air bearing wall, such as wall 198 of FIG. 5A. Such evaluation is conducted with respect to the design of the air bearing region and the predetermined amount of slider stiffness to determine a cross-sectional shape, elevation, and length to optimize pressure about a data transducer mounted on the data transducer feature.

Step 250 forms the chosen air bearing shape, feature configuration, and feature elevation on the slider body. One or more of the air bearing features may be configured with differing transitions that can be partially or wholly separated and have common or different cross-sectional shapes and elevations. The cross-sectional shapes of the protrusions can vary between cross track and down track directions, as shown in FIGS. 6A and 6B, which can be selectively formed to tune and optimize pressure about the trailing edge of the slider body.

Through the steps and decisions of routine 240, a variety of slider configurations with different pressures that optimize stiffness are possible. However, the routine 240 is not restricted to that shown in FIG. 7, as the steps and decisions can be modified, moved, and omitted without limitation. For example, decision 248 and 246 can be performed prior to the decision 244. Likewise, design and construction of any air bearing and transducer feature can be conducted in one or more steps at any point in the routine 240.

As can be appreciated, the air bearing features, air bearing region, and air bearing wall can be configured to provide a predetermined pressure about the trailing edge of the slider body, which may correspond to an optimized slider body stiffness that controls modulation of the slider whether the slider is in contact with a data storage media or in flight over the media.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
    a slider having at least one feature positioned in an air bearing region and separated from a data transducer positioned on a transducer protrusion, the at least one feature comprising an increasing elevation having a continuously curvilinear cross-section shape within a perimeter defined by an air bearing wall, the data transducer separated from the air bearing wall, the at least one feature configured to provide a slider stiffness that decreases modulation and allows data access operations to be conducted while the at least one feature and transducer protrusion are each floating above and while the at least one feature and transducer protrusion are each in contact with a data storage medium.

2. The apparatus of claim 1, wherein the increasing elevation comprises a first portion having a first cross-sectional area centered along the air bearing region to increase stiffness and pressure at a trailing edge of the slider.

3. The apparatus of claim 2, wherein the increasing elevation comprises a second portion having a second cross-sectional area greater than the first cross-sectional area.

4. The apparatus of claim 2, wherein the second portion has a greater elevation above a slider body than the first portion.

5. The apparatus of claim 3, wherein the first portion has a transverse length less than the second portion.

6. The apparatus of claim 3, wherein the second portion protrudes a predetermined elevation above a slider body longitudinally between the leading and trailing edges, the second portion shaped to localize pressure about the air bearing region.

7. The apparatus of claim 1, wherein the air bearing region has a varying depth profile provided by the at least one feature.

8. The apparatus of claim 7, wherein the air bearing region has a substantially rectangular shape having continually linear sidewalls proximal a trailing edge of the slider.

9. The apparatus of claim 7, wherein the air bearing region has a substantially arrowhead shape defined by a reduced sidewall clearance region and an increased sidewall clearance region distal a trailing edge of the slider and a tapered sidewall region proximal the trailing edge of the slider.

10. A method comprising:
providing a slider having at least one feature on an air bearing region, the at least one feature comprising an increasing elevation having a continuously curvilinear cross-section shape within a perimeter defined by an air bearing wall, the air bearing wall separated from a data transducer positioned on a transducer protrusion; and
configuring the at least one feature to produce a slider stiffness that decreases modulation and allows data access operations to be conducted while the at least one feature and transducer protrusion are each floating above and while the at least one feature and transducer protrusion are each in contact with a data storage medium.

11. The method of claim 10, wherein data recording is conducted while the at least one feature is in contact with the data storage medium.

12. The method of claim 10, wherein the at least one feature is optimized by configuring first and second portions of the increasing elevation with different elevations above a slider body.

13. The method of claim 10, wherein the at least one feature is optimized by decreasing transverse length from a first portion to a second portion of the increasing elevation.

14. The method of claim 12, wherein the second portion of the at least one feature increases pressure and stiffness of a trailing edge of the slider compared to the first portion of the at least one feature.

15. The method of claim 10, wherein the at least one feature focuses pressure about a data transducer proximal a trailing edge of the slider.

16. The method of claim 10, wherein the at least one feature contacts the data storage medium.

17. The method of claim 10, wherein contact between the at least one feature and the data storage medium is maintained with a predetermined duty cycle.

18. A method comprising:
providing a slider having at least one feature positioned on an air bearing feature and comprising an increasing elevation having a continuously curvilinear cross-section shape within a perimeter defined by an air bearing wall, the air bearing wall separated from a data transducer positioned on a transducer protrusion;
configuring the at least one feature with a varying side profile to provide a predetermined slider stiffness that decreases modulation while the at least one feature and transducer protrusion are each floating above that data storage medium and while the at least one feature and transducer protrusion are each in contact with data storage medium; and
recording data to a data storage medium while the at least one feature successively floats on an air bearing and maintains contact with the data storage medium.

19. The method of claim 18, wherein the stiffness is optimized by configuring multiple different elevations above a slider body to increase pressure at a trailing edge of the slider body.

20. The method of claim 18, wherein the data transducer is positioned on a transducer protrusion that allows the data transducer to pitch and displace, the transducer protrusion shaped to increase pressure about the at least one feature.

* * * * *